United States Patent [19]

Van den Bussche

[11] 3,781,463

[45] Dec. 25, 1973

[54] COLOUR TELEVISION CIRCUIT

[75] Inventor: Willem Van den Bussche, Emmasingel, Eindhoven, Netherlands

[73] Assignee: U.S. Philips Corporation, New York, N.Y.

[22] Filed: Nov. 18, 1971

[21] Appl. No.: 199,975

[30] Foreign Application Priority Data

Nov. 28, 1970 Netherlands ........................ 7017427

[52] U.S. Cl.. 178/5.4 CD, 178/5.8 R, 178/DIG. 23, 179/15.55 T

[51] Int. Cl. ........................... H04n 7/12, H04n 9/02

[58] Field of Search ................... 178/5.4 CD, 6.6 A, 178/5.8 R, DIG. 23; 179/15.55 T

[56] References Cited

UNITED STATES PATENTS

| | | | |
|---|---|---|---|
| 3,548,091 | 12/1970 | Bockwoldt | 178/5.4 CD |
| 3,504,352 | 3/1970 | Stromswold | 179/15.55 T |
| 3,391,247 | 7/1968 | Frohbach | 178/5.8 |

*Primary Examiner*—Howard W. Britton
*Attorney*—Frank R. Trifari

[57] ABSTRACT

A colour television system particularly intended for video recording in which two chrominance signals are transmitted line-sequentially in a time-compressed form during the line blanking period, preferably during the back porch of the line synchronisation. To this end they must be slowly written in and quickly read out in a bucket-brigade delay line by means of write and read control signals.

Two series-arranged bucket-brigade delay lines are provided at the receiver end, the first receiving the incoming signal and writing in and reading out this signal by means of write and read control signals. Said write and read control signals at the receiver end have the same frequencies as the read and write control signals, respectively, at the transmitter end. The output of the first bucket-brigade delay line is a direct output, but it is also connected to the input of the second bucket-brigade delay line to which a control signal is applied mainly during the line scan period, which control signal has the same frequency as the write control signal at the transmitter end.

The luminance signal is processed, with the required delay, in parallel with the chrominance signal.

20 Claims, 3 Drawing Figures

PATENTED DEC 25 1973 3,781,463

SHEET 1 OF 2

INVENTOR.
WILLEM VAN DEN BUSSCHE
BY
Frank R. Trifari
AGENT

INVENTOR.
WILLEM VAN DEN BUSSCHE
BY
[signature]
AGENT

COLOUR TELEVISION CIRCUIT

The invention relates to a colour television system in which a luminance signal and colour information constituted by one or more chrominance signals are transmitted and in which the luminance signal is transmitted in the conventional manner during each scanning part of a line period.

In the known colour television systems such as in the NTSC, PAL and SECAM systems the chrominance signal is transmitted within the same band as the luminance signal. This is possible because the spectrum of the luminance signal shows holes, as it were, in which the chrominance signal can be accommodated.

The drawback of these known systems is, however, that upon transmission and processing of the signals the luminance signal may still be influenced by the chrominance signals. Consequently, a filter tuned to the chrominance sub-carrier frequency is frequently used at the receiver end in PAL and NTSC systems. This, however, gives rise to loss of information of the luminance signal. In the SECAM system this influence is still stronger than in FM-modulation of the chrominance signal. Consequently, the SECAM system employs a cut-off filter at the transmitter end and a bandpass filter at the receiver end. Both filters are tuned to a frequency located near the subcarrier frequency. At the receiver and transmitter ends this tuning must be as accurately as possible which involves a critical adjustment. In addition the variation of a filter may have the risk that the correct adjustment of the transmitter relative to the receivers is lost again.

An object of the present invention is to obviate all these drawbacks and to this end it is characterized in that the colour information is transmitted in a form compressed in time during each blanking period of a line period, preferably during a back porch thereof.

The invention is based on the recognition of the fact that during the blanking period of each line period there is space available to transmit the colour information within the period of luminance information. During this blanking period exclusively the line synchronizing signals are transmitted so that the bandwidth capacity of the transmission or registration channel is not fully utilized. This is the case in the transmission method according to the invention and any influence of colour information on luminance information and conversely is excluded.

To realize this principle the colour television system according to the invention is furthermore characterized that a channel is present at the transmitter end, comprising a memory to which the chrominance signal is applied and in which mainly during the scan period of a line period a write control signal is applied to the memory for storing in the chrominance signal. Mainly during the subsequent line blanking period a read control signal is applied for fast reading of the written chrominance signal. The frequency of the read control signal is higher than the frequency of the write control signal to the extent that the read chrominance signal is compressed in time within the said line blanking period. A chrominance channel is present at the receiver end comprising at least one memory in which the received chrominance signal compressed during the line blanking period is written by means of a write control signal which has the same frequency as the read control signal at the transmitter end. The chrominance signal is read during the subsequent line scan period by means of a read control signal which has the same frequency as the write control signal at the transmitter end.

In order that the invention may be readily carried into effect, some embodiments thereof will now be described in detail by way of example with reference to the accompanying diagrammatic drawings, and with reference to a description of the transmitter and receiver sections and their use in the video-recorder field.

Figure 1:
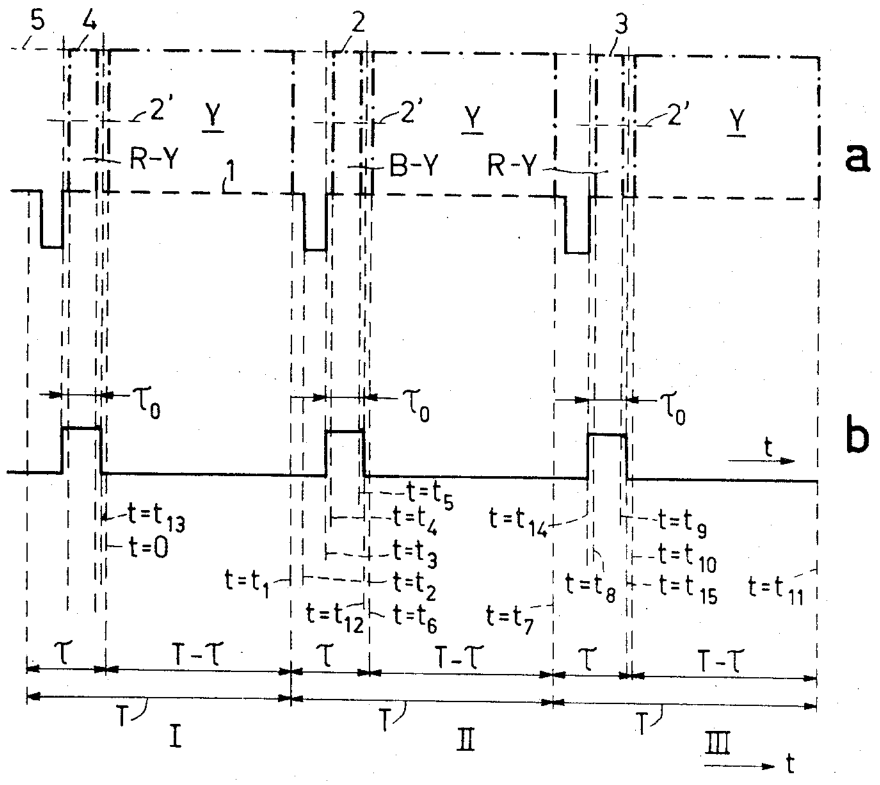
FIG. 1 shows the signals as they occur in the system.

FIG. 1a shows the total colour television signal as it appears ultimately at an output terminal of the transmitter section, while FIG. 1*b* shows a keying signal which is necessary to control the various switches in the transmitter section. The signal according to FIG. 1 is of course the signal which must be processed at the receiver end and the pulsatory keying signal according to FIG. 1*b* is the signal which must drive various switches at the receiver end.

The signal according to FIG. 1 is shown for three complete line periods I, II and III each having a period of time T. Such a line period T is divided into a line blanking period $\tau$ and a scan period T-$\tau$. For the description following hereinafter a television system in accordance with the CCIR standards has been taken as an example, having a line frequency of 15625 Hz and 25 images per second. Line period T is then 64 $\mu$ sec. For the example of figures chosen the line blanking period $\tau = 14.22$ $\mu$sec. and consequently the scan period $T-\tau = 49.78$ $\mu$sec.

During the first line period denoted by I in FIG. 1*a*, the scan period starts at the instant $t=0$ and ends at the instant $t=t_1$. During this scan period the luminance signal Y is exclusively transmitted in accordance with the system of the invention. In the subsequent line period denoted by II in FIG. 1*a* there follows firstly the so-called front porch from the instant $t=t_1$ up to the instant $t=t_2$. In the system chosen this front porch has a period of approximately 2.032 $\mu$sec.

The line synchronising signal occurs in the period $t=t_2$ to $t=t_3$ and, as is known, this signal serves for synchronizing the line generator at the receiver end. The duration of the line synchronizing pulse is 4.060 $\mu$sec in the example of figures chosen.

The line synchronising pulse is followed by a so-called back porch which lasts from the instant $t=t_3$ up to the instant $t=t_6$ whereafter the scan period of the line period II starts. The time of the back porch in the example of figures chosen is 8.128 $\mu$sec so that the total time of front porch plus duration of synchronising pulse plus back porch is again exactly 14.22 $\mu$sec, which is the time for the total blanking period $\tau$.

According to the principle of the invention the colour information is transmitted in a time-compressed form during the said back porch, which for period II is denoted by the chain-link line 2 above line 1 in FIG. 1a and this within the back porch period $t=t_3$ to $t=t_6$. Particularly it has been indicated that the so-called blue colour difference signal B-Y is transmitted during this period. It is to be noted that neither the limitation of the blue colour difference signal nor the limitation of transmission of the compressed chrominance signal during the said back porch is essential for the principle of the invention. Any chrominance signal may be arbitrarily chosen for this purpose and in addition time compression might be extended throughout the blanking period $\tau$. When, for example, synchronisation is provided in a different manner, this means that also the period of time $t=t_1$ to $t=t_3$ is free for possible transmission of colour information in a compressed form. However, as will be apparent hereinafter it is possible to accommodate the chrominance signal in the period of time $t=t_4$ to $t=t_5$ which is even slightly shorter than the total time of the back porch when the ratio between the frequencies of write and read control signals is correct when assuming that the bandwidth of the chrominance signal is 0.5 MHz at a maximum.

From the instant $t=t_6$ to the instant $t=t_7$ the luminance signal Y is transmitted which is associated with the colour difference signal B-Y compressed in time. Subsequently the blanking period $\tau$ of the third line period III follows. This blanking period lasts from the instant $t=t_7$ to $t=t_{10}$ and during the back porch section thereof, namely from the instant $t=t_8$ to the instant $t=t_9$ the second colour difference signal R-Y is transmitted in a time-compressed form which is denoted by the chain-link line 3 in FIG. 1*a*. During the subsequent scan period from $t=t_{10}$ to $t=t_{11}$ the luminance signal Y is transmitted again which is associated with the colour difference signal R-Y denoted by line 3.

The time during which the compressed colour difference signal is transmitted, which is the time $t=t_4$ to $t=t_5$ and $t=t_8$ to $t=t_9$ is 6.22 $\mu$sec.

As is evident the colour difference signal B-Y is transmitted in a time-compressed form during the back porch following line period III and the red colour difference signal R-Y is transmitted during the subsequent line back porch. All this results in a line-sequential transmission of the two colour difference signals R-Y and B-Y so that also during the line back porch period the red colour difference signal R-Y denoted by the chain-link line 4 occurs just before the instant $t=0$.

The system according to the invention has various advantages.

1. As already noted in the preamble interference between luminance and colour information cannot occur because both kinds of information are transmitted separated in time.

2. As is apparent from FIG. 1*a* both the chrominance signal and the luminance signal can be modulated to the line 5 which line 5 represents peak white. This means that the full modulation depth is available for both signals. This results in the more favourable signal-to-noise ratio for the luminance signal than in the known colour systems in which it is hardly ever possible to modulate the luminance signal to exactly the same value as a monochrome signal.

The chrominance signal must have both positive and negative components. It follows therefrom that the chrominance signal changes about the line 2' which is located halfway line 1 (black level) and line 5 (white level).

3. Since chrominance and luminance signal are modulated in the same ratio (maximum amplitude of the chrominance signal lies between the lines 2 and 5 and maximum amplitude of the luminance signal lies between the lines 1 and 5) the same proportional influence on the amplitude of the luminance and chrominance signal can be exerted at the receiver end. Therefore it is possible to control the composite video signal and to influence the chrominance and luminance information proportionally.

4. As will be apparent hereinafter the write and read control pulses are coupled to the line frequencies so that line frequency variations which are not too fast are admissible because the control pulses adapt thereto. This is particularly important in any form of video recording.

5. In case of bandwidth limitation the colour information is limited in definition proportionally with the luminance information.

6. Except for the field frequency the system is usable without switching for other standards, for example, such as are used in the USA and in Japan where only 525 lines per picture are used.

FIG. 1*b* shows the keying signal which is necessary to control the various switches in transmitter and receiver. As is apparent from FIG. 1*b* this gating signal has the same period T as the video signals of line frequency. The pulse duration of this signal = $\tau_o$ and is 7.11 $\mu$sec being one-ninth part of the line period. This is slightly shorter than the total back porch period of 8.128 $\mu$sec but slightly longer than the periods $t=t_4$ to $t=t_5$ and $t=t_8$ to $t=t_9$ being 6.22 $\mu$sec and this has been done to ensure that writing and reading can be effected with sufficient certainty. Thus FIG. 1*b* shows that during the line period II the pulse duration starts at the instant $t=t_8$ and ends at the instant $t=t_{12}$ while during line period III it starts at the instant $t=t_{14}$ and ends at $t=t_{15}$. The instant $t=t_3$ is located just before the instant $t=t_4$ and the instant $t=t_{12}$ is located just after the instant $t=t_5$.

Figure 2:
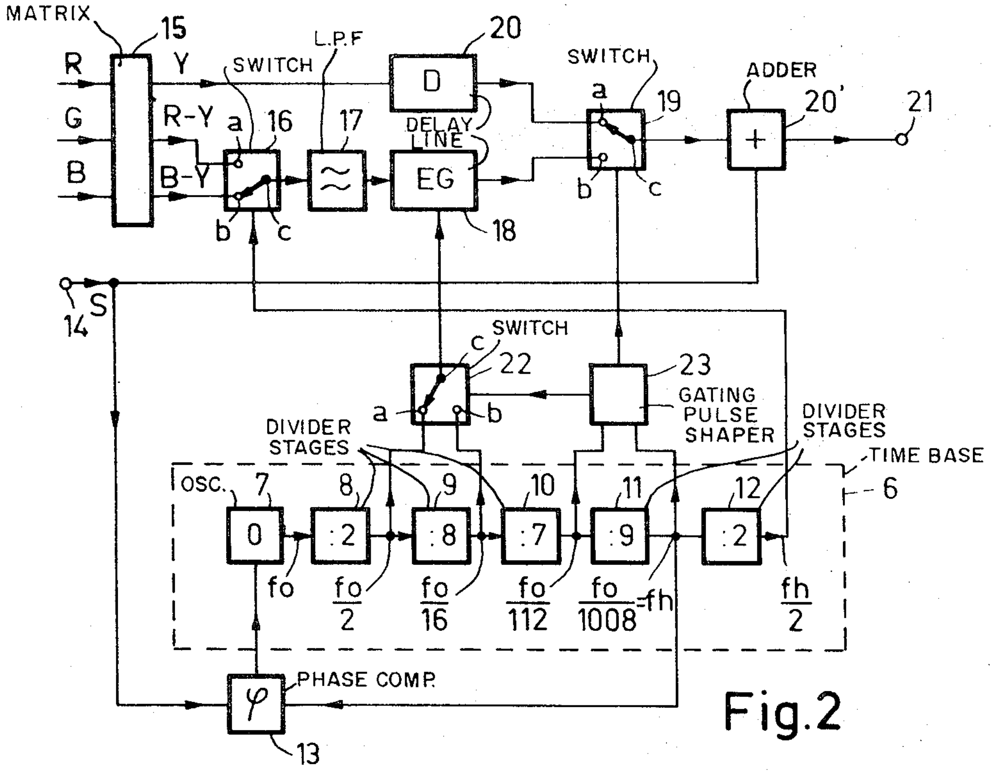
FIG. 2 shows the transmitter section for generating the signals of FIG. 1.

FIG. 2 shows a possible embodiment of a transmitter section for generating the video signal according to FIG. 1.

In FIG. 2 an essential part is formed by the time base 6 which consists of an oscillator 7, a first stage 8 dividing by two, a second stage 9 dividing by eight, a third stage 10 dividing by seven, a fourth stage 11 dividing by nine and finally a last stage 12 dividing by two. To meet the various values of the times denoted in FIG. 1 the oscillator signal provided by oscillator 7 must have a frequency $f_o$ = 15.75 MHz which is equal to $1008 \cdot f_h$ in which $f_h$ represents the line frequency. The various frequencies of the signals which occur at the outputs of the divider stages 8 to 12 are shown in table I below.

TABLE

| Type of signal | Frequency | Relation with the line frequency $f_h = 1/T$ |
|---|---|---|
| output oscillator 7 | $fo$=15.75 MHz | $fo$=1008 $f_h$ |
| output divider 8 | $fo/2$=7.875 MHz | $fo/2$=504 $f_h$ |
| output divider 9 | $fo/16$=984.375 KHz | $fo/16$=63 $f_h$ |
| output divider 10 | $fo/112$=140.625 KHz | $fo/112$=9 $f_h$ |
| output divider 11 | $fo/1008$=15625 Hz | $fo/1008$=$f_h$ |
| output divider 12 | $f_h/2$=7812.5 Hz | $f_h/2$ |

FIG. 2 shows that the output signal from divider 11 of the line frequency $f_h$ is compared in a phase comparison stage 13 with a signal S derived from an input terminal 14 and representing the line synchronizing signal. However, in those cases where studio equipment is concerned, the time base 6 may form part of the time base arrangement completely present at the studio end. It is then not necessary to apply signal S from terminal 14, but oscillator 7 may be a crystal oscillator which is so stable that synchronisation is not necessary.

Furthermore the circuit arrangement according to FIG. 2 includes a matrix circuit 15 to whose inputs three chrominance signals, namely the red chrominance signal R, the green chrominance signal G and the blue chrominance signal B are applied. These signals may originate, for example, from three camera tubes together constituting a colour television camera. The luminance signal Y, the red colour difference signal R-Y and the blue colour difference signal B-Y are produced at three outputs of the matrix circuit 15. They may, however, alternatively originate from the outputs of a colour television receiver in which the signal received with the aid of this receiver is to be recorded on an appropriate medium of a video recorder. If this possibility is used the luminance signal Y and the two colour difference signals can be directly derived from the receiver so that matrix 15 may be omitted. The two colour outputs of the matrix 15 are connected to the contacts *a* and *b* of switch 16 whose master contact *c* leads to a lowpass filter 17 which in turn is connected to a so-called bucket-brigade delay line 18. Such a bucket-brigade delay line is described inter alia in U.S. Pat. No. 3,546,490. Such a bucket-brigade delay line has two important properties. Firstly it is capable of functioning as a memory but in addition a signal having a given speed can be written in while it can be read out again at a speed which is different relative to the writing speed. This property is of special importance for realizing the principle of the present invention. However, the bucket-brigade delay line need not be the only means with which the required compression and expansion of the chrominance signal can be obtained. In principle other memories are feasible with which writing in can be effected at a different speed than reading out. For example, there are memory tubes in which the signal is written in with the aid of a first electron beam and at a first speed and is read out with the aid of a second electron beam at a second speed deviating from the first speed. Alternatively a magnetic disc may be used as a memo whose head has different rotational speeds for writing in and reading out.

One output of the bucket-brigade delay line 18 is connected to a contact *b* of a switch 19 whose other contact *a* is connected to an output of a delay line 20 to which delay line the luminance signal Y derived from the matrix circuit 15 is applied. Consequently, the section of the circuit arrangement according to FIG. 2 for processing the actual video signal can be split up in two channels, namely the chrominance channel consisting of the parts 16, 17 and 18 and the luminance channel actually consisting of the delay line 20 plus supply and return leads. The master contact *c* of switch 19 is connected to an adder stage 20 in which the synchronizing signal S originating from terminal 14 is added to the overall colour television signal. The output of the adder stage 20 is connected to an output terminal 21 from which the overall colour television signal plus the synchronizing signal can be derived.

The signal derived from terminal 21 may be handled in different manners. Firstly this signal may be modulated on a high-frequency carrier and after amplification and addition of the associated sound it may be applied to an aerial for transmission in the case where the relevant colour television is to be used for broadcasting purposes. However, it is alternatively possible to connect terminal 21 to a video recorder so that the colour television signal can be recorded on an appropriate medium. In the latter case the output terminal 21 is connected through an appropriate modulator to the recording head of such a video recorder. Such a video recorder may be of a type in which magnetic recording takes place in which case the appropriate medium is a magnetic tape.

It is alternatively possible for the appropriate medium to be a so-called video record which, as is known, can be compared with the normal gramophone record on which tracks are provided which, however, in case of video recording are very fine tracks because the relatively high frequencies of the FM-modulated video signal must be recorded. The drawback of such a video record is that it is substantially impossible to record very low frequencies in addition to the required relatively high frequencies. The conventional method in colour television in which the colour television signal is modulated on a relatively low carrier frequency and is then recorded on the magnetic tape is therefore impossible for such video records. Thus, when video recording is to be effected on a video record, the output terminal 21 may be connected through an appropriate modulation to a recording head which in this case gives an appropriate mechanism a mechanical vibration so that this mechanism can provide the tracks on the video record.

The operation of the circuit arrangement according to FIG. 2 is as follows. As is apparent from table I, the frequency $fo/2$ has a value of 7.875 MHz and the frequency $fo/16$ has a value of 984.375 kHz. As will be apparent herinafter the signal of the frequency $fo/16$ which is applied through contact *b* and contact *c* in an appropriate position of the switch 22 to the bucket-brigade delay line 18 is the write control signal in the transmitter section. The signal of the frequency $fo/2$ which is eight times higher than the frequency $fo/16$ and which reaches the bucket-brigade delay line 18 through the contacts *a* and *c* in the appropriate position of switch 22 is the so-called read control signal. Since the chrominance signal as applied to the inputs R, G and B of the matrix 15 becomes available during the scan period $T\text{-}\tau$ of a line period, the colour difference signal R-Y and B-Y are also available during this scan period. Consequently, when switch 16 is in the position shown in FIG. 2, contacts *b* and *c* of switch 16 will be interconnected so that during the scan period then occurring, which applied, for example, in FIG. 1 to line period I, the blue colour difference signal B-Y is applied to the bucket-brigade delay line 18 from the instant $t=O$ up to the instant $t=t1$ through the lowpass filter 17. Simultaneously switch 22 must be switched by the signal according to FIG. 1*b* derived from gating pulse shaper 23 in such a manner that the contacts *c* and *b* are interconnected so that during the period $t=O$ to $t=t_1$ the read control signal of the frequency $fo/16$ is applied to the bucket-brigade delay line 18. This means that during the period $t=O$ to $t=t_1$ the blue colour difference signal B-Y is written in the bucket-brigade delay line at the said frequency of 984.375 kHz; that is to say, it is roughly written in at a frequency of 1 MHz. In the relevant embodiment switch 22 is changed over from position *c–b* to position *c–a* at the instant $t=t_3$. This means that from that instant the write control signal is applied to the bucket-brigade delay line 18 at the frequency $fo/2 = 7.875$ MHz which can be roughly adjusted at 8 MHz. It follows that during the period $t=t_1$ to $t=t_3$ the write control signal is still applied, but since there is no colour information present during this period in the video signal supplied this actually means that no video information is stored in the bucket-brigade delay line 18. It must only be ensured that the bucket-brigade delay line 18 includes a sufficient number of storage elements which, as is apparent from the said U.S. Pat. No. 3,546,470, have the shape of capacitors with associated switching transistors so that video information applied to the input of the delay line 18 is not already read out during the period $t=t_1$ to $t=t_3$. Since switch 22 is already set in position *c–b* by the control signal shown in FIG. 1*b* for period I at the instant $t=t_{13}$ and since the actual colour information only becomes available at the instant $t=O$, there is only a short time during writing namely the period $t=t_{13}$ to $t=tO$ when no video information is written in the bucket-brigade delay line.

When switch 22 is changed over by the control signal shown in FIG. 1*b* during the period II and at the instant $t=t_3$, so that the contacts *a* and *c* are interconnected, the read control signal of frequency $fo/2$ will be applied from that instant to the bucket-brigade delay line. This means that the entire information, which is written from the instant $t=t_{13}$ to $t=t_3$ in the bucket-brigade delay line, will then be read out during the period $t_3$ to $t_{12}$ at a frequency which is eight times higher. Again taking into account the periods $t=t_{13}$ to $t=t_0$ and $t=t_1$ to $t=t_3$ when no video information is written in, the compressed signal will only comprise information regarding the colour B-Y during the period denoted by the chain-link line 2, that is to say, ultimately in the period $t=t_4$ to $t=t_6$. The period $t=t_3$ to $t=t_4$ is the time-compressed period $t=t_{13}$ to $t=t_0$ during writing and the same applies to the period $t=t_1$ to $t=t_3$ relative to the period $t=t_5$ to $t=t_{12}$. In summary it can thus be stated that the colour difference signal B-Y applied during the line period I by means of the bucket-brigade delay line 18 and the write and read control signals applied thereto become ultimately available at the output of bucket-brigade delay line 18 during the line back porch of the second line period II and this in the said period of from $t=t_4$ to $t=t_5$. At the instant $t=t_{12}$ switch 22 is again changed over by the signal shown in FIG. 1b and contacts *c* and *b* are interconnected. Simultaneously, however, switch 16 is changed over by the signal $f_h/2$ to the contacts *a* and *c* so that the red colour difference signal R-Y is applied to the bucket-brigade delay line 18 during the line period II. This means that during line period II the red colour difference signal is written in the bucket-brigade delay line 18 in a corresponding manner as described for the blue colour difference signal B-Y and during the line period III the same red colour difference signal is read out in a time-compressed form during the period $t=t_{14}$ to $t=t_{15}$ which is denoted in FIG. 1*a* by the chain-link line 3. This proves that the colour difference signal is present in a sequential form in the output signal derived from the bucket-brigade delay line 18, namely in a time-compressed form during every back porch associated with the relevant line period.

It is to be noted that in the case where a tube is used as a memory the write and read control signals must control the deflection of the electron beams and when a magnetic disc is used they must determine the different rotational speeds of the head.

It will be evident that due to changing over the switch 16 at half the line frequency by means of the signal derived from divider 12 a different chrominance signal will every time be compressed on the back porch so that the wanted sequential transmission is obtained.

To ensure that the luminance signal associated with the chrominance signal of the same line is also present at the correct point in the signal ultimately appearing at terminal 21, the luminance channel includes the delay line 20 which delays exactly over one line period T. It is achieved thereby that the luminance signal Y associated with the line period I of FIG. 1*a* is delayed to the line period II and therefore exactly comes after the time-compressed colour difference signal B-Y which is denoted by the chain-link line 2 of FIG. 1*a*. The same of course applies to the luminance signal Y which appears during the line period II at the output terminal of matrix 15 and which appears at the output of the delay line during the period $t=t_{10}$ to $t=t_{11}$ of line period III and therefore is associated with the red colour difference signal R-Y which is denoted by the chain-link line 3 in FIG. 1a. It is of course alternatively possible to provide the delay line 20 in the luminance channel of the receiver to be described hereinafter instead of at the transmitter end.

Switch 19 is controlled by the same signal according to FIG. 1*b* which is applied from the gating pulse shaper 23 to both switch 22 and switch 19. In that case switch 19 is in position *a–c* from the instant $t=t_{13}$ to $t=t_3$ and from $t=t_{12}$ to $t=t_{14}$, etc. and it is in position *b–c* during the periods $\tau_o$ of the switching signal according to FIG. 1*b*.

It is to be noted that the pulsatory switching signal according to FIG. 1*b* is derived in gating pulse shaper 23 from the signals originating from divider stages 10 and 11 of frequencies $fo/112 = 9{\cdot}f_h$ and $fo/1008 = f_h$, respectively, i.e., the line frequency. The last-mentioned signal provides for the pulse repetition frequency of the period T while the signal of the frequency $9{\cdot}f_h$ provides for the generation of the pulses at a duration of $\tau_o$. Since the frequency $9{\cdot}f_h$ of the signal derived from the divider stage 10 is exactly nine times higher than the frequency $f_h$, the pulse duration $\tau_o$ will be equal to one-ninth T. Consequently a pulse duration of $\tau_o = 7.11$ $\mu$sec is obtained which is sufficiently longer than the 6.22 $\mu$sec occupied by the colour difference signals whenever they occur during the line back porch. These 6.22 $\mu$sec are found when the period $T-\tau = 49.78$ $\mu$sec is divided by 8 which is the factor by which the write control frequency $fo/16$ must be multiplied so as to obtain the read control frequency $fo/2$. In this respect it is to be noted that the control signal of the frequency $fo/2 = 7.875$ MHz which occurs during the period $\tau_o = 7.11$ $\mu$sec shifts during this period $7.875 \times 7.11 \approx 56$ periods. The control signal $fo/16 = 984.345$ kHz which occurs during the period $T - \tau_o = 64 - 7.11 = 58.69$ $\mu$sec shifts during this period also, for example, $0.984375 \times 56.89 \approx 56$ periods. It follows that when the bucket-brigade delay line includes approximately 56 storage elements, this is the correct number to satisfactorily write and read all information during shifting. Since $7 \times 8 = 56$ and divider 9 divides by 8, it follows that the division number is 7 for divider 10.

When as stated hereinbefore the lowpass filter limits the incoming colour difference signal to a value of 0.5 MHz, this bandwidth is also to be multiplied by a factor of 8 after compression and therefore a bandwidth of 4 MHz is obtained for the time-compressed colour difference signal. When during recording on an appropriate medium the bandwidth is limited, both the colour and the luminance will be proportionally limited in definition thereby as is apparent from the advantage mentioned hereinbefore under item 5.

Figure 3:
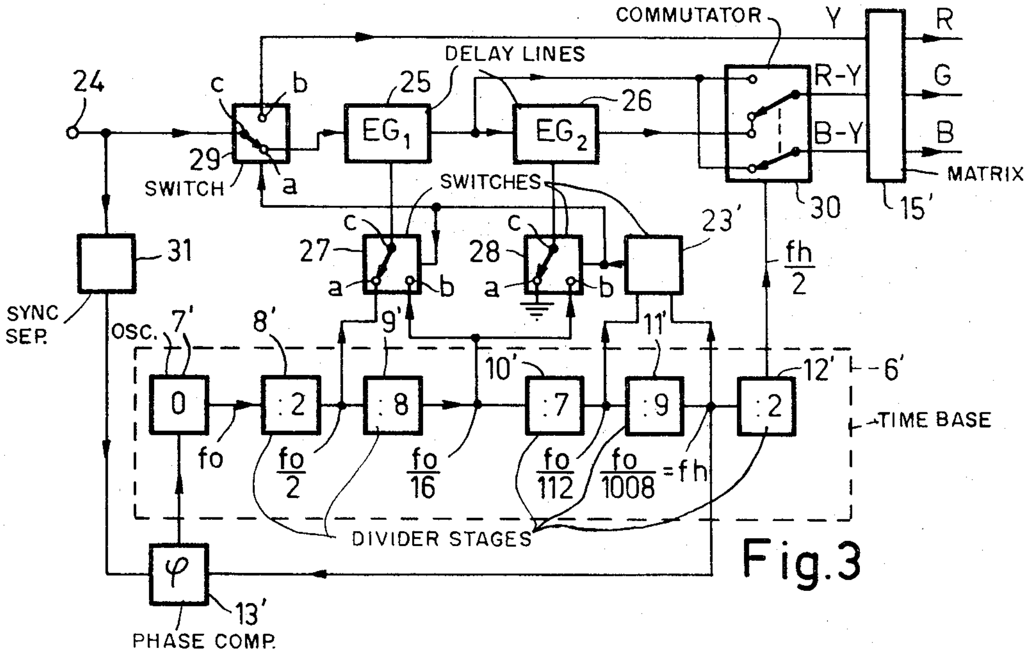
FIG. 3 shows the receiver section for processing the signal derived from the transmitter section of FIG. 2.

After transmission through wireless transmission described hereinbefore or after recording on an appropriate medium, the signal derived from terminal 21 is made available again for the terminal 24 of the receiver section of FIG. 3. The receiver section of FIG. 3 includes two series-arranged bucket-brigade delay lines 25 and 26. The receiver section furthermore includes a divider stage 6' which is built up in exactly the same manner as the divider stage 6 at the transmitter end and which has the same stages, namely an oscillator stage 7' and divider stages 8' to 12'. The only difference is that write and read control signals are interchanged, as it were, because the incoming signal includes the colour difference signal in a time-compressed form and therefore the first bucket-brigade delay line 25 according to FIG. 3 must write the compressed colour difference signal during a line back porch in an accelerated manner, that is to say, the write control signal has the frequency *fo*/2 in this case. The signal derived from gating pulse shaper 23' of FIG. 3 having the shape of the signal shown in FIG. 1*b* must switch the switches 27, 28 and 29 in the positions shown in FIG. 3 with the contacts *a–c* being interconnected whenever a line back porch occurs. This means that during the line back porch the signal coming in from terminal 24 and having the shape according to FIG. 1*a* is applied through the switching contacts *a–c* to the bucket-brigade delay line 25 which then receives the write control signal of the frequency *fo*/2 so that the time-compressed colour difference signal is written in the correct manner in bucket-brigade delay line 25. Again assuming that the signal is considered for the first time during the line period II according to FIG. 1*a*, the blue colour difference signal B-Y is written in the bucket-brigade delay line 25 during the period $t_3$ to $t_{12}$.

At the instant $t=t_{12}$ switches 27, 28 and 29 are changed over so that then the contacts *c–b* are interconnected. As regards switch 27 this means that then the read control signal of frequency *fo*/16 is applied to the bucket-brigade delay line 25 so that the blue colour difference signal B-Y written in during the period $t_3$ to $t_{12}$ is read out during the period $t_{12}$ to $t_{14}$ so as to become available at the output of the bucket-brigade delay line 25. In that case colour information is only present during the period $t_6$ to $t_7$ because then the blue colour difference signal B-Y is expanded in time until siad time of 49.78 μsec, which is eight times 6.22 μsec during which it was compressed in the incoming signal. At the same time the commutator 30 is in the position shown in FIG. 3 so that the signal derived from the output of the bucket-brigade delay line 25 then becomes available through the then closed contacts of the commutator 30 at the input denoted by B-Y of the matrix circuit 15' at the receiver end.

As already noted hereinbefore, switch 29 also interconnects the contacts *c* and *b* during the period $t_{12}$ to $t_{14}$ so that during this period the luminance signal Y becomes available at the input of the matrix circuit 15'. The lead between contact *b* for switch 29 and the input of matrix 15' denoted by Y is therefore to be considered as the luminance channel which runs parallel with the chrominance channel and the bucket-brigade delay lines 25 and 26 and the commutator 30.

It can also be shown that during the period $t=t_6$ to $t=t_7$ the red colour difference signal R-Y can be derived from the output of the second bucket-brigade delay line 26. In fact, as is apparent from FIG. 1*a*, the red colour difference signal R-Y is present in the signal coming in on terminal 24 during the line period I and during the period deonted by the chain-link line 4. When considering what happens during the said line period I, it is seen that the red colour difference signal R-Y reaches the bucket-brigade delay line 25 during the period denoted by the chain-link line 4 and through the then closed contacts *c* and *a* of switch 29. In a corresponding manner as described hereinbefore for the blue colour difference signal B-Y during line period II it can be shown for the red colour difference signal R-Y, via the contacts *a* and *c* of switch 27, that this signal will then be written in the bucket-brigade delay line 25 by the applied write control signal. At the instant $t=t_{13}$ switch 27 is changed over and during the period $t=t_{13}$ to $t=t_3$ the red colour difference signal is read out from the bucket-brigade delay line and becomes available at the output of this bucket-brigade delay line. This signal is not only passed on to the commutator 30 but also during the period $t=t_0$ to $t=t_1$ to the input of the second bucket-brigade delay line 26. Since switch 28 interconnects contacts *c* and *b* the signal of frequency *fo*/16 is applied to bucket-brigade delay line 26. As regards the chrominance signal applied from delay line 25 to delay line 26 this signal may be considered as a write control signal so as to be able to write in this colour difference signal R-Y. At the instnat $t=t_3$ switch 28 also reverses its position from *c–b* to position *c–a.* As is apparent from FIG. 3 contact *a* is grounded, that is to say, no control signal is applied to the bucket-brigade delay line 26 during the period $t_3$ to $t_{12}$. It follows therefrom that during the period $t_3$ to $t_{12}$ the red colour difference signal R-Y written in the bucket-brigade delay line 26 remains stored therein. When at the instant $t=t_{12}$ switch 28 changes over, so that from that instant up to the instant $t=t_{14}$ switch 28 interconnects the contacts *c* and *b*, the control signal reaches the bucket-brigade delay line 26 through the switch 28 so that the red colour information stored therein during the line period I is read out during the period $t_{12}$ to $t_{14}$ and therefore becomes available at the output of bucket-brigade delay line 26. This means that the control signal applied to delay line 26 can now be considered as the read control signal. Since, as already noted hereinbefore, commutator 30 is in the position shown during the line period II, the red colour difference signal becomes available at the input, denoted by R-Y, of the matrix circuit 15'. This proves that during the period $t_{12}$ to $t_{14}$ and particularly during the period $t_6$ to $t_7$ the three signals Y, R-Y and B-Y are simultaneously available at the three inputs of the matrix 15' and can be converted in the matrix circuit 15' into the three chrominance signals R, G and B.

During line period III the same process actually takes place as described hereinbefore for line period II. However, during period III commutator 30 is switched over at half the line frequency to the position not shown by the signal originating from divider 12. Consequently, the input denoted by R-Y is interconnected to the output of bucket-brigade delay line 25 and the input denoted by B-Y of matrix 15' is interconnected to the output of bucket-brigade delay line 26. This is necessary because during the period $t=t_{10}$ to $t=t_{11}$ the red colour difference signal R-Y can be derived from bucket-brigade delay line 25 which signal was written in this delay line during the period $t_{14}$ to $t_{15}$ while in the same period of the blue colour difference signal B-Y can be derived from the bucket-brigade delay line 26, which signal was written in this delay line during the period $t=t_6$ to $t=t_7$, as from the blue colour difference signal B-Y provided during said period by bucket-brigade delay line 25. It follows from the above that bucket-brigade delay line 26 is simultaneously written in and read out. This is possible because there is no video information in the incoming signal during the front porch and during the occurrence of the line synchronising pulses while during these periods ($t_1$ to $t_3$, $t_7$ to $t_{14}$ etc.) the control signal still reaches the bucket-brigade delay line 26 through the contacts *b–c* of switch 28. Consequently, the signal written in for bucket-brigade delay lines 25 and 26 is, as it were, slightly shifted so that storage elements at its input are emptied. During the next line period the written chrominance signal is read out from delay line 26 while the signal coming in from delay line 25 can simultaneously be written in the empty storage elements the input of delay line 26. Consequently, when the number of 56 storage elements calculated for this purpose is selected, it is ensured that the beginning and the end of the written and read signals, respectively, in delay line 26 do not meet each other.

It will be evident that for the line periods subsequent to line period III the same process will again be effected as described hereinbefore for line period II. This proves that the three signals Y, R-Y and B-Y are simultaneously available at the input of the matrix circuit 15' for each line period.

It is to be noted that the gating pulse shaper 23' operates in a corresponding manner as the pulse shaper 23 at the transmitter end.

Furthermore the receiver section of FIG. 3 includes a synchronizing separator stage 31 which separates the synchronizing signal present in the total incoming signal from the video signal. Consequently, the synchronising signal S becomes available at the output of the stage 31, which signal can be compared in the phase comparison stage 13' with the line frequency signal originating from divider stage 11'. This ensures that oscillator 7' at the receiver end is in synchronism with oscillator 7 at the transmitter end. This is strictly necessary because writing in and reading out of the bucket-brigade delay lines 25 and 26 must be in synchronism with reading out and writing in of the bucket-brigade delay line 18 at the transmitter end. However, this requirement is satisfied by said synchronisation.

The manner of switching shown in FIG. 3 employing two series-arranged bucket-brigade delay lines 25 and 26 is the simplest manner to ensure that the three signals are simultaneously available at the inputs of the matrix circuit 15'. In principle it is, however, alternatively possible to arrange bucket-brigade delay lines in parallel instead of in series. An analysis shows that three instead of two bucket-brigade delay lines are necessary if the two colour difference signals from each line period are to be available simultaneously. Therefore a circuit arrangement in which bucket-brigade delay lines are connected in parallel is more complicated than the circuit arrangement shown in FIG. 3.

Furthermore, it will be evident that the matrix circuit 15' is not necessary in all cases. If the three chrominance signals R, G and B are not required to be individually available but if there is provided a colour tube in which the luminance signal Y is applied to the cathode and the colour difference signals R-Y, B-Y and G-Y are applied to the three Wehnelt cylinders, the third green colour difference signal G-Y may be derived in known manner during each line period from the signals R-Y and B-Y becoming available simultaneously.

It will also be evident that it is not necessary to always work with the above-described colour difference signals R-Y and B-Y. Alternatively the signals I and Q which, as known from the American NTSC system represent a given combination of chrominance signals, may be transmitted in a time-compressed form on the line back porches in accordance with the line-sequential principle and may be processed at the receiver end in a corresponding manner as described for the colour difference signals. In that case, however, both the matrix 15 at the transmitter end and the matrix 15' at the receiver end must be formed in a different manner in order to render a correct generation of the signals I and Q possible at the transmitter end and to process these signals at the receiver end.

The principle of the invention need not be limited to a system in which in principle three chrominance signals R, G and B are generated and are transmitted in the form of luminance signal Y and two associated colour difference signals (R-Y and B-Y or I and Q), but a so-called two-signal system, the so-called Land system may be sufficient. In that case a luminance signal and a chrominance signal are transmitted which can then be transmitted in a time-compressed form during each line back porch and processed with one bucket-brigade delay line at the receiver end. This means that in the latter case the second bucket-brigade delay line 26 with the associated switch 28 and the commutator 30 may be omitted.

In principle it is also possible to compress in time one colour information at the transmitter end (for example, line I or R-Y) and to transmit it every time during the back porch of the line synchronisation, and the other colour information (for example, line Q or B-Y) may be modulated in a normal manner in a chrominance sub-carrier having a frequency which is equal to an odd multiple of half the line frequency or a quarter of the line frequency and which is located within the band for the luminance signal. This provides the advantage that the two chrominance signals are always simultaneously available so that only one bucket-brigade delay line is required at the receiver end. This is offset by the fact that the chrominance signal modulated on the sub-carrier can exert influence on the luminance signal.

Finally it is to be noted that the various switches in FIGS. 2 and 3 are shown diagrammatically. In practice these will always be electronic switches.

What is claimed is:

1. A circuit comprising means for transmitting a television luminance signal during the scan time of a line period, and means for time compressing and for transmitting at least one corresponding chrominance signal during the blanking time of said line period.

2. A circuit as claimed in claim 1 wherein said compressing and transmitting means transmits said chrominance signal during the back porch interval of said blanking time.

3. A circuit as claimed in claim 1 wherein said television signal comprises two chrominance signals and said compressing and transmitting means comprises means for transmitting said chrominance signals in the blanking times of alternate sequential line scans.

4. A circuit as claimed in claim 3 wherein said two chrominance signals comprise two color difference signals.

5. A circuit as claimed in claim 1 wherein said compressing and transmitting means comprises a memory adapted to receive said chrominance signal, and means for applying to said memory a write signal during said scan period for writing in said chrominance signal and for applying to said memory a read signal during the subsequent blanking period, the frequency of said read signal being higher than the frequency of said write signal by the amount of said time compression.

6. A circuit as claimed in claim 5 wherein said applying means comprises an oscillator, a frequency divider stage coupled to said oscillator and having a plurality of sequential divider stages, a switch coupled to said stages for obtaining said read and write signals and to said memory, means for deriving an alternating line frequency switching control signal from said divider and applying it to said switch, said control signal having a maximum pulse duration equal to said line blanking period.

7. A circuit as claimed in claim 6 wherein said television signal comprises two chrominance signals and further comprising means for line sequentially transmitting said two chrominance signals comprising a second switch having inputs adapted to receive said chrominance signals, an output coupled to said memory, and a control input means coupled to said divider for receiving a half line frequency control signal.

8. A circuit as claimed in claim 7 further comprising means for delaying said luminance signal one line period; a third switch having two inputs coupled to said delay means and said memory respectively, a control input coupled to said applying means, and an output means for providing an output signal.

9. A circuit as claimed in claim 8 further comprising a recording head coupled to said third switch output, and a recording medium disposed near said head.

10. A circuit as claimed in claim 9 further comprising modulating means coupled between said head and said third switch.

11. A circuit as claimed in claim 9 wherein said medium comprises magnetic tape.

12. A circuit as claimed in claim 9 wherein said medium comprises a video record disk.

13. A circuit for receiving a color television signal having a luminance signal occurring during a line scan period and a time compressed chrominance signal occurring during the line blanking period, said circuit comprising at least one memory adapted to receive said chrominance signal, and means for sequentially applying write and read control signals to said memory during said blanking and scan periods respectively, the frequency of said write signal being greater than the frequency of said read signal by an amount equal to said time compression.

14. A circuit as claimed in claim 13 wherein said applying means comprises an oscillator, a frequency divider stage coupled to said oscillator and having a plurality of sequential divider stages, a switch coupled to said stages for obtaining said read and write signals and to said memory, means for deriving an alternating line frequency switching control signal from said divider and applying it to said switch, said control signal having a maximum pulse duration equal to said line blanking period.

15. A circuit as claimed in claim 14 wherein said television signal has two line sequential chrominance signals, said receiver further comprising a second memory having an input coupled to the output of said first memory; a commutator having four input and two output terminals, two of said terminals being coupled to said first memory output, the remaining two input terminals being coupled to the second memory output; means coupled to said divider for providing a one half line frequency switching signal to said commutator, means for applying to said second memory a control signal other than during said blanking period comprising a switching means coupled to said divider stages and to said second memory.

16. A circuit as claimed in claim 15 further comprising a line frequency switch having an input adapted to receive said television signal, a first output coupled to said first memory input, and a second output for providing said luminance signal.

17. A circuit as claimed in claim 16 further comprising a playback head disposed near a recording medium and coupled to said last recited switch input.

18. A circuit as claimed in claim 17 further comprising a demodulator coupled between said head and said last recited switch.

19. A circuit as claimed in claim 17 wherein said medium comprises magnetic tape.

20. A circuit as claimed in claim 17 wherein said medium comprises a video record disk.

* * * * *